United States Patent [19]

Funazaki et al.

[11] Patent Number: 4,854,704
[45] Date of Patent: Aug. 8, 1989

[54] OPTICAL AUTOMATIC LEVELLING APPARATUS

[75] Inventors: Ichizi Funazaki; Haruo Tani, both of Hadano, Japan

[73] Assignee: Sokkisha Co., Ltd., Tokyo, Japan

[21] Appl. No.: 143,892

[22] Filed: Jan. 14, 1988

[30] Foreign Application Priority Data

Jan. 20, 1987 [JP] Japan .................................. 62-9065

[51] Int. Cl.⁴ .............................................. G01C 9/12
[52] U.S. Cl. .................................. 356/250; 356/149
[58] Field of Search ................... 356/149, 250, 138; 33/283, DIG. 21

[56] References Cited

U.S. PATENT DOCUMENTS 3,936,197 2/1976 Aldrink et al. ................. 356/149 X
4,221,483 9/1980 Rando ................................. 356/250

FOREIGN PATENT DOCUMENTS 162734 11/1985 European Pat. Off. .
11114 1/1985 Japan .................................. 356/250
844964 8/1960 United Kingdom .
1262548 2/1972 United Kingdom .
1400167 7/1975 United Kingdom .

Primary Examiner—F. L. Evans
Attorney, Agent, or Firm—Armstrong, Nikaido, Marmelstein, Kubovcik & Murray

[57] ABSTRACT

A light source, such as a laser diode, is positioned on a mount bed facing upwardly. A lens device is supported a support member extending upwardly from the mount bed. The lens device consists of a concave lens and convex lens and is provided to convert the rays of light emitted by the light source to parallel rays of light perpendicular to a true horizontal plane. The concave lens is suspended above the light source by plural wires from the support member. The convex lens is supported above the concave lens by at least one arm attached to the support member. A motorized rotatable reflector device is mounted on the support member above the lens device and reflects the parallel rays of light therefrom in a horizontal direction.

7 Claims, 4 Drawing Sheets

OPTICAL AUTOMATIC LEVELLING APPARATUS

BACKGROUND OF THE INVENTION

This invention relates to an optical automatic levelling apparatus for use in leveling the ground setting-out cooperation with a light receptor by emitting a laser beam in a horizontal direction of from 0° to 360° about a vertical axis to form a horizontal plane.

A heretofore known optical automatic levelling apparatus has a construction such as is shown in FIG. 9. A support plate c is fixed onto four support poles b which are mounted on a mount bed a. The mount bed a is kept horizontal by three leveling screws i. A laser diode d is fitted to the lower surface of the support plate c facing downwardly. A convex lens f is suspended by three suspension wires e, the opposite ends of which are fixed to the support place c in such a manner that even when the apparatus is inclined within a range of about 10', the convex lens f always moves in the direction of gravitational force by its own weight and is positioned in a perpendicular direction of the laser diode d. A rotary penta mirror h (which consists of mirrors $m_1$ and $m_2$) which reflects the parallel laser beams g leaving the convex lens f in the orthogonal direction thereto, that is, in the horizontal direction, is rotatably supported on the mount bed a. Furthermore, the apparatus includes a motor (not shown) for rotating the rotary penta mirror h and a damper (not shown) for preventing vibration of the convex lens f to prevent a measurement error due to the vibration of the convex lens at the time of inclination of the apparatus.

In accordance with the conventional apparatus described above, the support poles b exist around the outer periphery of the rotary penta mirror. Accordingly, when any support pole b exists between the penta mirror h and the light receptor (not shown), the ray of light emitted from the rotary penta mirror h is intercepted by the support pole b and does not reach the light receptor. Therefore, the conventional apparatus involves the inherent problem that it includes four positions where measurement cannot be made.

The checking operation of the vibration of the convex lens by the damper described above (hereinafter called an "automatic compensation action") can be improved by increasing the length of the suspension wires e. However, when a convex lens having a large focal length is used at the same distance as when the suspension wire e is short, the angular aperture $\theta$ (the angle of expansion of the rays of light of the light source incident on the convex lens f) becomes small so that the quantity of light of the laser beam passing through the convex lens f becomes small and eventually, the reach of the laser beam becomes short and the range of measurement becomes narrow. On the other hand, when a convex lens f having the same angular aperture as when the suspension wire e is short is used and the range of the measurement is the same, the convex lens f is great in size and heavy in weight so that the reliability of automatic compensation action drops. Generally, the automatic compensation action cannot be improved as a whole.

For the reasons described above, the conventional apparatus involves the problem that the effect of the automatic compensation action cannot be improved without making the range of measurement narrow.

The present invention is directed to provide an optical automatic levelling apparatus which solves the provlems of the prior art apparatuses described above.

In an optional automatic levelling apparatus including a light source, a lens means for converting the ray of light emitted from the light source to a parallel ray of light perpendicular to a true horizontal plane, a rotary reflector capable of rotation, for reflecting the parallel ray of light from the lens means in a horizontal direction and a driving motor for rotating the rotary reflector, the optical measuring apparatus to accomplish the object described above is characterized in that the lens means consists of a concave lens and a convex lens, the light source is disposed on a mount bed in such a manner as to face upwardly, the concave lens is suspended from a support member extending from the mount bed by suspension wires, the convex lens is disposed above the concave lens by the support member and the rotary reflector is disposed at the upperpart of the support member.

In this specification, a true horizontal plane is one which is perpendicular to an imaginary vertical line between the center of the earth and a point in consideration.

The length of the suspension wires for suspending the convex lens is set to $$L_2 = d_1 + \left(1 + \frac{d_1}{d_2}\right)f_2$$

so that even when the apparatus is inclined as a whole at a minute angle such as within the range of about 10', the rays of light incident to the rotary reflector become always perpendicular-to-horizontal rays of light. Here, $d_1$ is the distance between the concave lens and the convex lens, $d_2$ is the distance between the light source and the concave lens and $f_2$ is the focal length of the concave lens. The reason why this relationship is established will be explained next.

Assuming that the apparatus is inclined as a whole at a minute angle with a point $p_1$ on the support member as the center as shown in FIG. 1, the light source moves from a point $O_1$ to a point $O_2$ while the center $c_1$ of the convex lens moves to $c_2$. The center of the concave lens would move from a poinst $c_3$ to a point $c_4$ at the time of inclination if fixedly supported, but actually remains unchanged because it returns to its original position in accordance with the principle of a pendulum because it is supported by the suspension wires.

In FIG. 1, it will be assumed that the rays of light of the light source leaving the point $O_2$ turn to light ray $l_1$ through the concave lens and the convex lens (through the lens center $c_2$).

In order for this ray of light $l_1$ to become the perpendicular-to-horizontal light ray (the ray of light parallel to the perpendicular axis $\overline{O_1p_1}$), the ray of light $l_3$ of the light source leaving the point $O_2$ must be refracted by the convex lens, becomes the perpendicular-to-horizontal ray of light $l_2$ and pass through the center $c_2$ of the convex lens. To satisfy this condition, the ray of light $l_3$ must pass through the reflection point $c_3'$ of the concave lens and be incident on the focus of the concave lens.

The condition necessary for satisfying the relationship described above are as follows:

In FIG. 2 which is an expanded view of the state shown in FIG. 1, when the rays of light $l_1$ and $l_2$ are parallel to the perpendicular-to-horizontal axis $\overline{O_1p_1}$, $$\theta \cdot L_2 \approx y_1 + y_2$$

Therefore, $$\theta \cdot L_2 \approx \theta \cdot d_1 + \alpha \cdot f_2 \quad (1)$$

Since $\alpha = \theta + \beta$ and $\theta \cdot d_1 = \beta \cdot d_2$ (with the proviso that $\theta \approx 0$, $\beta \approx 0$, $\alpha \approx 0$), the formula (1) becomes as follows:

$$L_2 = d_1 + \left(1 + \frac{d_1}{d_2}\right)f_2 \quad (2)$$

The distance $L_2$ between this point $p_1$ and the concave lens is the length of the suspension wire.

As obvious from the formula (2), the length of the suspension wire can be elongated while keeping constant the angular aperture of the lens, that is, the distance $d_2$ between the concave lens and the light source, by changing the distance $d_1$ between both lenses and the focal length $f_2$ of the concave lens.

In order to convert the ray of light of the light source leaving the point $O_1$ of to the parallel rays of light through the concave lens and the convex lens, the distance $L_1$ between the light source and the convex lens, the distance $d_2$ between the light source and the concave lens, the distance $d_1$ between both lenses, the focal length $f_1$ of the convex lens and the focal length $f_2$ of the concave lens are determined in such a manner as to satisfy the following relationship while the relationship described above is satisfied:

$$F = f_1 \cdot f_2/(f_1 + f_2 - d_1) \quad (3)$$

$$L_1 = d_1 + d_2 = f_1 - \frac{f_2}{f_1} \cdot F \cdot \left(1 - \frac{f_1}{F}\right)^2 \quad (4)$$

with the proviso that in the formula (3) and (4), F represents the focal length of the synthetic lens system consisting of the convex lens and the concave lens.

In FIG. 3, $\overline{O_1p_1}$ represents the perpendicular-to-horizontal line passing through the center $C_3$ of the concave lens and the center $c_1$ of the convex lens.

In the manner described above, a concave lens which is lighter in weight than the convex lens can be suspended from the support member through long suspension wires so that the automatic compensation action can be improved without making the range of measurement narrow. The perpendicular-to-horizontal ray of light leaving the convex lens is reflected by the rotary reflector disposed rotatably at the upper part of the support member in an orthogonal direction, that is, in the horizontal direction, and the true horizontal rays of light can be emitted in all directions without being intercepted by any support member.

Hereinafter, an embodiment of the present invention will be explained with reference to the accompanying drawings.

DETAILED DESCRIPTION OF PREFERRED EMBODIMENT

Figure 1:
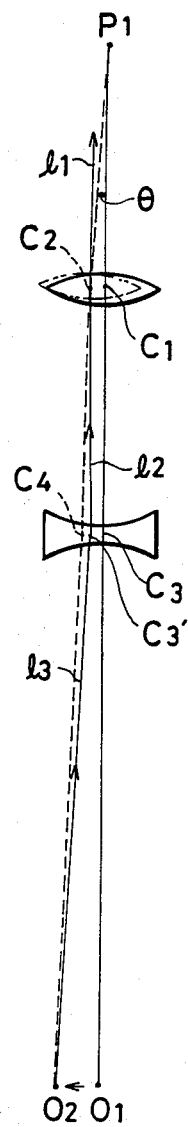
FIGS. 1 to 3 are explanatory views useful for explaining the principle of the present invention.
Figure 2:
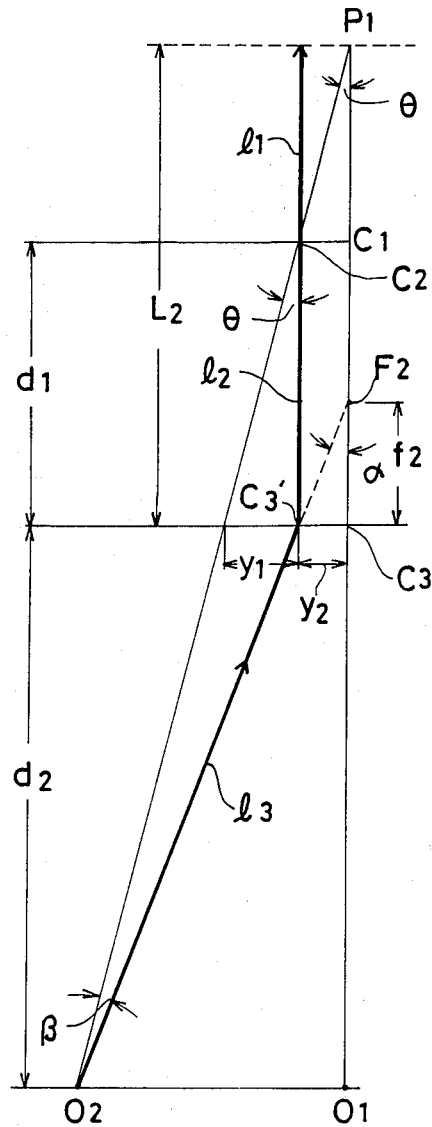
Figure 3:
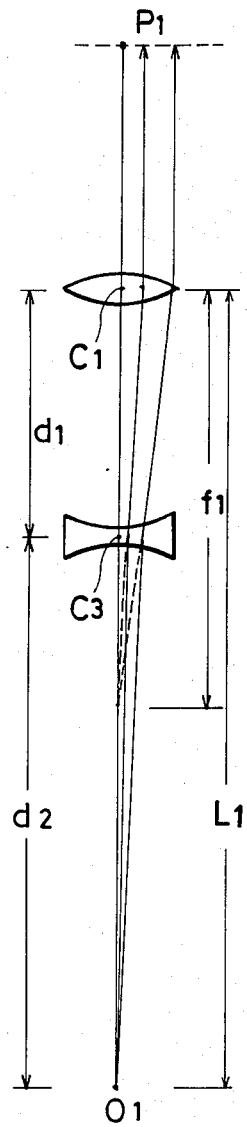
Figure 4:
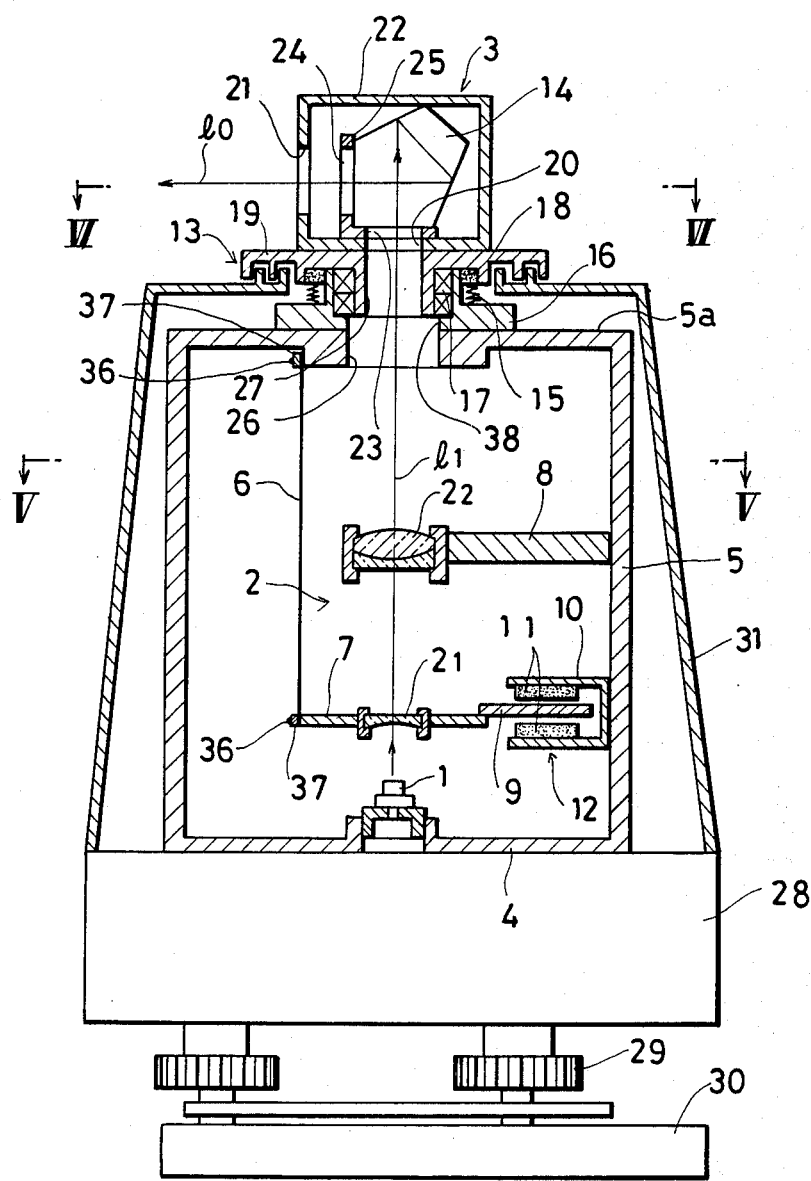
FIG. 4 is a sectional view of the principal portion of one embodiment of the present invention.
Figure 5:
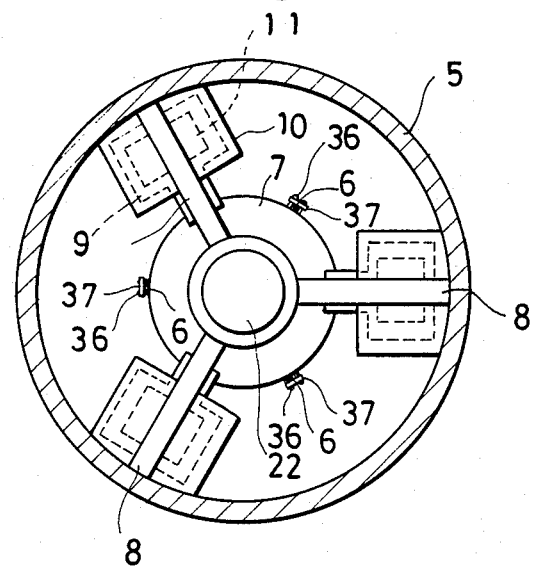
FIG. 5 is a sectional view taken along line V—V of FIG. 4.
Figure 6:
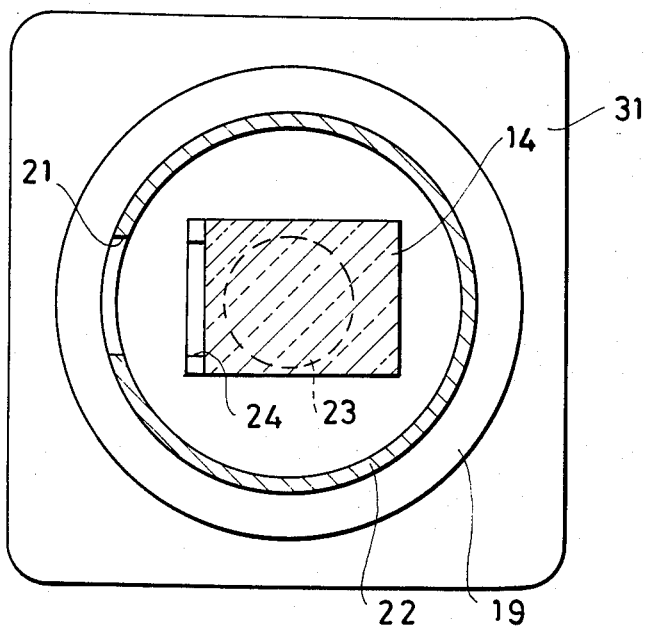
FIG. 6 is a sectional view taken along line VI—VI of FIG. 4.

In FIGS. 4 to 6, a laser diode 1 is used as the light source. A lens 2 converts the rays of light emitted from the laser diode to perpendicular-to-horizontal parallel rays of light. This lens 2 consists of a concave lens $2_1$ and a convex lens $2_2$. A rotary reflector 3 such as a rotary penta prism redirects the light rays from the lens 2.

The laser diode 1 is disposed on a mount bed 4 facing upwardly. The concave lens $2_1$ is suspended a support member in the form of a cylinder 5 by suspension wires 6 and a lens support frame 7. The cylinder 5 is fixed to the mount bed 4. The convex lens $2_2$ is supported above the concave lens $2_1$ by a means which is shown as three supporting arm 8 fixed at three equally divided positions of the circumference of the cylinder 5, in such a fashion that when the apparatus of the invention is placed horizontally, the convex lens $2_2$ is positioned on the perpendicular-to-horizontal line passing through the laser diode 1 together with the concave lens $2_1$. Three wires are used, for example, as the suspension wires 6 described above and one of the ends of each suspension wires 6 is fixed at an equally divided position of the circumference of the lens support frame 7 with the other end of each wire being fixed to the upper part of the cylinder 5 to horizontally suspend the concave lens $2_1$. More in detail, each suspension wire 6 has a round cross-sectional shape so that it can easily cause pendulum motion in all directions and both of its end portions are fixed to the outer peripheral plane of the lens support frame 7 and to the upper lid 5a of the cylinder 5, respectively, by support plates 37 which are mounted by screws 36.

Three damping plates 9 made of a non-magnetic material such as aluminum or copper are fixed to the lens support frame 7 and are inserted between two magnets 11 mounted on respective yokes 10 at three equally divided positions of the circumference of the inner wall of the cylinder 5 in such a manner as to constitute a damper 12 for damping the vibration of the concave lens $2_1$.

The rotary reflector 3 mentioned above is disposed rotatably at the upper part of the cylinder 5 and is rotated horizontally by a brushless motor 13 fitted to the cylinder 5.

The above brushless motor 13 consists of a stator 16 to which a coil 15 is fitted and a disc-like rotor 19 having a permanent magnet 18. The rotor 19 is supported rotatably by a bearing 17 and cooperates with the coil 15. The rotary reflector 3 includes a penta prism 14 fixed inside a cover 22. The cover 22 fixed to the upper surface of the disc-like rotor 19 and has apertures 20 and 21 on its bottom and side surfaces. The penta prism 14 is mounted on an L-shaped seat plate 25 having apertures 23 and 24 on its bottom and side surfaces corresponding to apertures 20 and 21, respectively.

The perpendicular-to-horizontal parallel laser beam $l_1$ leaving the convex lens $2_2$ is incident on the penta prism 14 through the upper aperture 26 of the cylinder 5, the center aperture 38 of the stator 16, the center aperture 27 of the disc-like rotor 19, the aperture 20 of the cover 22 and the aperture 23 of the L-shaped seat plate 25, is reflected inside the penta prism 14, changing to a horizontal parallel laser beam $l_0$ and exits through the aperture 24 of the L-shaped seat plte 25 and the aperture 21 of the cover 22. This horizontal parallel laser beam $l_0$ is emitted in the directions of from 0° to 360° with the rotation of the rotary reflector 3 and form horizontal plane of light.

In FIG. 4, reference numeral 28 represents a case of a battery used to power the light source (the laser diods 1), the brushless motor 13 and the like. Reference numeral 29 represents a level adjustment knob disposed between a base 30 and the case 28. Reference numeral 31 represents a cover.

Though the embodiment described above uses a laser diode as the light source, LED can also be used if it is a point light source.

Figure 7:
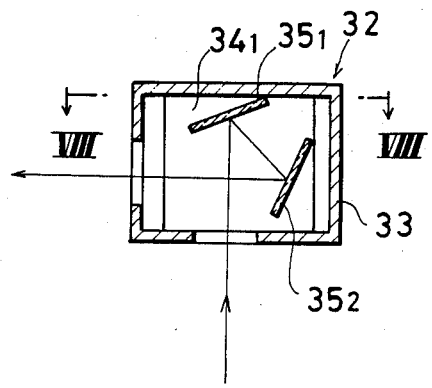
FIG. 7 is a sectional view of another example of a rotary reflector.
Figure 8:
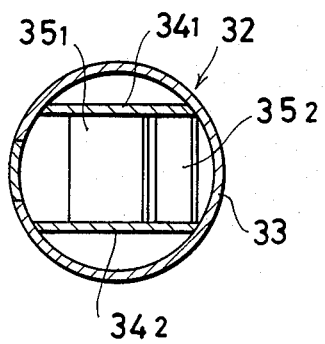
FIG. 8 is a sectional view taken along line VIII—VIII of FIG. 7.
Figure 9:
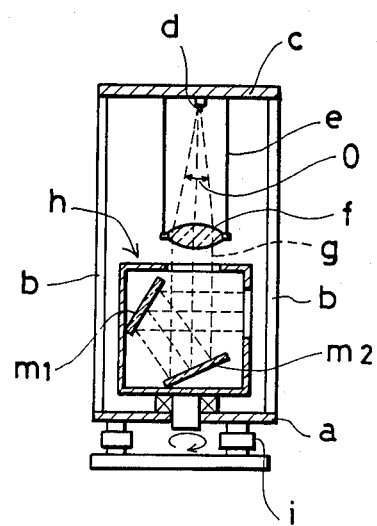
FIG. 9 is a schematic sectional view of the principal portions of a prior art example.

Though the rotary reflector 3 is used as the rotary reflector, it is also possible to use a rotary penta mirror 32 such as shown in FIGS. 7 and 8. As shown in the drawings, this rotary penta mirror 32 has a construction wherein reinforcing pltes $34_1$ and $34_2$ are positioned inside a cylindrical cover 33 so as to face each other. Both side edges of both mirrors $35_1$ and $35_2$ are bonded by an adhesive to the reinforcing plates $34_1$ and $34_2$ at the same angle as the reflection surfaces of the penta prism 14.

As described above, the present invention can improve the automatic compensation action, that is, the damping action of the vibration of the concave lens suspended by the suspension wires, without narrowing the measurement range, can emit a horizontal ray of light in all directions without being intercepted by support members, and can therefore improve the accuracy of level measurement.

It is readily apparent that the above-described meets all of the objects mentioned above and also has the advantage of wide commercial utility. It should be understood that the specific form of the invention hereinabove described is intended to be representative only, as certain modifications within the scope of these teachings will be apparent to those skilled in the art.

Accordingly, reference should be made to the following claims as determining the full scope of the invention.

What is claimed is:

1. An optical automatic levelling apparatus, comprising:
   a mounting bed;
   a light source positioned so as to face upwardly on said mounting bed;
   a support member upwardly extending from said mounting bed;
   lens means for converting light rays emitted from said light source to parallel rays of light which are perpendicular to a true horizontal plane, said lens means comprises a concave lens and a convex lens;
   a plurality suspension wires for suspending said concave lens from said support member above said light source;
   means attached to said support member for supporting said convex lens above said concave lens;
   a rotatable reflector means mounted on said support member above said lens means for reflecting said parallel rays of light from said lens means in a horizontal direction; and
   a driving means on said support member for rotating said reflector means, wherein a distance $L_2$ of said suspension wires for suspending said concave lens is selected in such a manner as to satisfy the following equation:

$$L_2 = d_1 + \left(1 + \frac{d_1}{d_2}\right)f_2$$

where
$d_1$ is distance between said convex lens and said concave lens,
$d_2$ is distance between said concave lens and said light source,
$f_2$ is a focal length of said concave lens, and the distance $L_1$ between said convex lens and said light source is selected in such a manner as to satisfy the following equation:

$$L_1 = f_1 - \frac{f_2}{f_1} \cdot F\left(1 - \frac{F_1}{F}\right)^2$$

where
F is a focal length of synthetic lens having said convex lens and said concave lens, wherein $F=f_1 \cdot f_2/(f_1+f_2-d_1)$, and
$f_1$ is a focal length of said convex lens.

2. The optical automatic levelling apparatus as defined in claim 1 wherein said support member consists of a cylinder having an upper lid.

3. The optical automatic levelling apparatus as defined in claim 2 wherein said driving means is a motor having a stator fixed to said upper lid of said cylinder, and a disc-shaped rotor; said rotatable reflector means is fitted to an upper part of said disc-shaped rotor; and the ray of light emitted from said convex lens is incident on said rotatable reflector means through aligned apertures in said upper lid, said stator and said disc-shaped rotor.

4. The optical automatic levelling apparatus as defined in claim 3 wherein said concave lens is suspended from said upper lid of said cylinder by said suspension wires and said means for supporting said convex lens are by arms fixed to inner wall of said cylinder.

5. The optical automatic levelling apparatus as defined in claim 1 wherein said rotatable reflector means is a rotatable penta prism.

6. The optical automatic levelling apparatus as defined in claim 1 wherein said rotatable reflector means is a rotatable penta mirror consisting of two mirrors.

7. The optical automatic levelling apparatus as defined in claim 1 wherein magnets are mounted on said support member and damping plates fixed to said concave lens are disposed adjacent to said magnets.

* * * * *